(12) United States Patent
Tsironis (10) Patent No.: US 12,517,169 B1
(45) Date of Patent: Jan. 6, 2026

(54) MULTI-BAND HARMONIC TUNER USING REVOLVING TUNING PROBES

(71) Applicant: Christos Tsironis, Kirkland (CA)

(72) Inventor: Christos Tsironis, Kirkland (CA)

( * ) Notice: Subject to any disclaimer, the term of this patent is extended or adjusted under 35 U.S.C. 154(b) by 218 days.

(21) Appl. No.: 18/545,052

(22) Filed: Dec. 19, 2023

(51) Int. Cl.
  *G01R 31/28* (2006.01)
  *H01P 5/04* (2006.01)

(52) U.S. Cl.
  CPC ............ *G01R 31/2822* (2013.01); *H01P 5/04* (2013.01)

(58) Field of Classification Search
  CPC .............................. G01R 31/2822; H01P 5/04
  See application file for complete search history.

(56) References Cited

U.S. PATENT DOCUMENTS

| | | |
|---|---|---|
| 6,980,064 B1 | 12/2005 | Boulerne |
| 7,135,941 B1 | 11/2006 | Tsironis |
| 8,098,112 B2 | 1/2012 | Simpson |
| 8,358,186 B1 | 1/2013 | Tsironis |
| 9,252,738 B1 | 2/2016 | Tsironis |
| 9,625,556 B1 | 4/2017 | Tsironis |
| 9,899,984 B1 * | 2/2018 | Tsironis ............. G01R 31/2822 |
| 10,429,484 B1 * | 10/2019 | Tsironis ................... H03H 7/40 |
| 11,621,468 B1 * | 4/2023 | Tsironis ................... H03H 7/38 333/33 |

OTHER PUBLICATIONS

"Load Pull" [online] Wikipedia, [Retrieved on Aug. 24, 2017]. Retrieved from Internet <URL: https://en.wikipedia.org/wiki/Load_pull>.
"Computer Controlled Microwave Tuner—CCMT", Product Note 41, Focus Microwaves Inc., Jan. 1998.

* cited by examiner

*Primary Examiner* — Nasima Monsur
*Assistant Examiner* — Courtney G McDonnough (57) ABSTRACT

Multi band remotely configurable tuning probes for slide screw impedance tuners allow instantaneous larger frequency coverage beyond the capacity of existing tuning probes using the single horizontal and vertical axis mechanism of a prior art single probe, single band tuner. This is done by installing three slugs of different length and frequency coverage on a revolving disc-formed holder, which rotates inside the legs of a captive unit and locks in distinct angles. The captive unit is attached to the vertical control mechanism of the tuner and rotation is ensured using a permanent fork close to the idle port of the tuner. An automated procedure ensures remote toggling between tuner states. Calibration and tuning is as in prior art single probe tuners.

8 Claims, 11 Drawing Sheets

MULTI-BAND HARMONIC TUNER USING REVOLVING TUNING PROBES

PRIORITY CLAIM

Not Applicable

CROSS-REFERENCE TO RELATED ARTICLES

1. "Load Pull" [online] Wikipedia, [Retrieved on 2017 Aug. 24]. Retrieved from Internet <URL: https://en.wikipedia.org/wiki/Load_pull>.
2. "Computer Controlled Microwave Tuner, CCMT", Product Note 41, Focus Microwaves Inc. 1998, pages 2-4
3. Tsironis, C. U.S. Pat. No. 8,358,186, "Impedance Tuners with Resonant Probes".
4. Boulerne, P. U.S. Pat. No. 6,980,064, "Slide-screw Tuner with Single Corrugated Slug".
5. Simpson, G. U.S. Pat. No. 8,098,112, "Impedance Tuner Systems and Probes".
6. Tsironis, C. U.S. Pat. No. 9,252,738, "Wideband Tuning Probes for Impedance Tuners and Method".
7. Tsironis, C. U.S. Pat. No. 9,625,556, "Method for Calibration and Tuning with Impedance Tuners".
8. Tsironis, C. U.S. Pat. No. 7,135,941, "Triple probe automatic slide screw load pull tuner and method".

BACKGROUND OF THE INVENTION

This invention relates to general high frequency testing and in particular to testing of microwave transistors (DUT) in the high power, high frequency (typically GHz range) domain using Load Pull (see ref. 1). Load Pull is a measurement method whereby the load impedance presented to the DUT at a given frequency is changed systematically and the DUT (device under test) performance is registered, with the objective to find an optimum matching network to be connected to the DUT for obtaining the design objectives of the amplifier, which may be maximum gain, power, efficiency, linearity or else.

PRIOR ART

Figure 1:
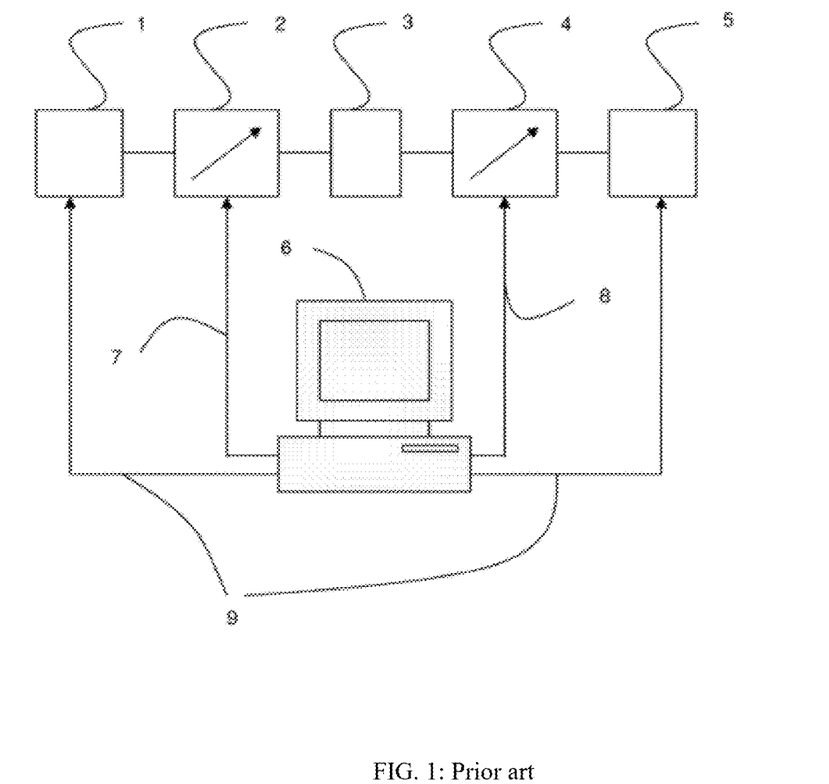
FIG. 1 depicts prior art, a typical scalar (measuring amplitude only) load pull test system using pre-calibrated passive tuners.

The popular load pull method for testing and characterizing medium to high-power microwave transistors (DUT) is called "load-pull" and uses appropriate test setups (FIG. 1, see ref. 1). Low noise transistors are tested using "source-pull". Load or source pull use, especially at high power, harmonic impedance tuners 2, 4 (see ref. 2 and 8) and other test equipment, such as signal or noise sources 1, test fixtures 3 housing the DUT, and power meters or low noise receivers 5, the whole controlled by a computer 6; the computer controls and communicates with the tuners 2, 4 and the other equipment 1, 5 using digital cables 7, 8, 9. The tuners are used in order to manipulate the microwave impedance conditions in a systematic and controlled manner, under which the DUT is tested (see ref. 1); harmonic impedance tuners allow determining the optimum fundamental and harmonic impedance conditions of matching networks for designing the amplifiers and other microwave components for specific performance targets, such as gain, efficiency, intermodulation etc.

Typical impedance tuners use the slide screw concept, where a reflective tuning probe is positioned precisely inside a slotted airline (slabline); since the tuning probe 34 in slide screw tuners is capacitively coupled with the center conductor 33, this means increasing the maximum controllable capacitance by increasing the surface between the probes and the center conductor, which is possible, while avoiding a short circuit, only by increasing its horizontal length 37. Various types of resonant or combination tuning probes, including one or more slugs, have been reported before (see ref. 3, 4, 5 and 6); however, none includes remotely configurable revolving tuning probe assemblies allowing to switch between individual tuning probes (slugs) in situ and enhance the tuner frequency coverage, implantable in existing tuners and controlled using only the existing horizontal and vertical movement control of a single probe per carriage tuner.

BRIEF DESCRIPTION OF THE INVENTION

The object of this invention is a harmonic load pull tuner using two or more revolving multi-slug remotely configurable tuning probes, controlled, and configured by a single vertical axis tuner structure (FIG. 2), without additional remote-control electronics or human intervention. This expands the instantaneous frequency coverage beyond the capacity of each individual tuning slug using only the simplest control and mechanics of a single vertical axis control mechanism of existing single slug per carriage harmonic tuners. This is done by combining three tuning slugs of different length, covering different frequency ranges, into a revolving tuning assembly, the slugs being mounted and controlled by the same mobile tuner carriage using the single vertical axis mechanism of FIG. 2 and of ref. 2, and: (a) allows larger maximum to minimum frequency coverage, (b) can replace existing tuning probes in existing tuners without additional remote-control and (c) can use existing tuner calibration and data processing routines, all this effected with minimum cost and without requiring any major structural modification to existing tuners, additional internal remotely controlled mechanisms and, last not least, no external manual intervention to perform the configuration.

DETAILED DESCRIPTION OF THE DRAWINGS

The invention and its mode of operation will be better understood from the following detailed description when read with the appended drawings in which.

DETAILED DESCRIPTION OF THE INVENTION

Figure 2:
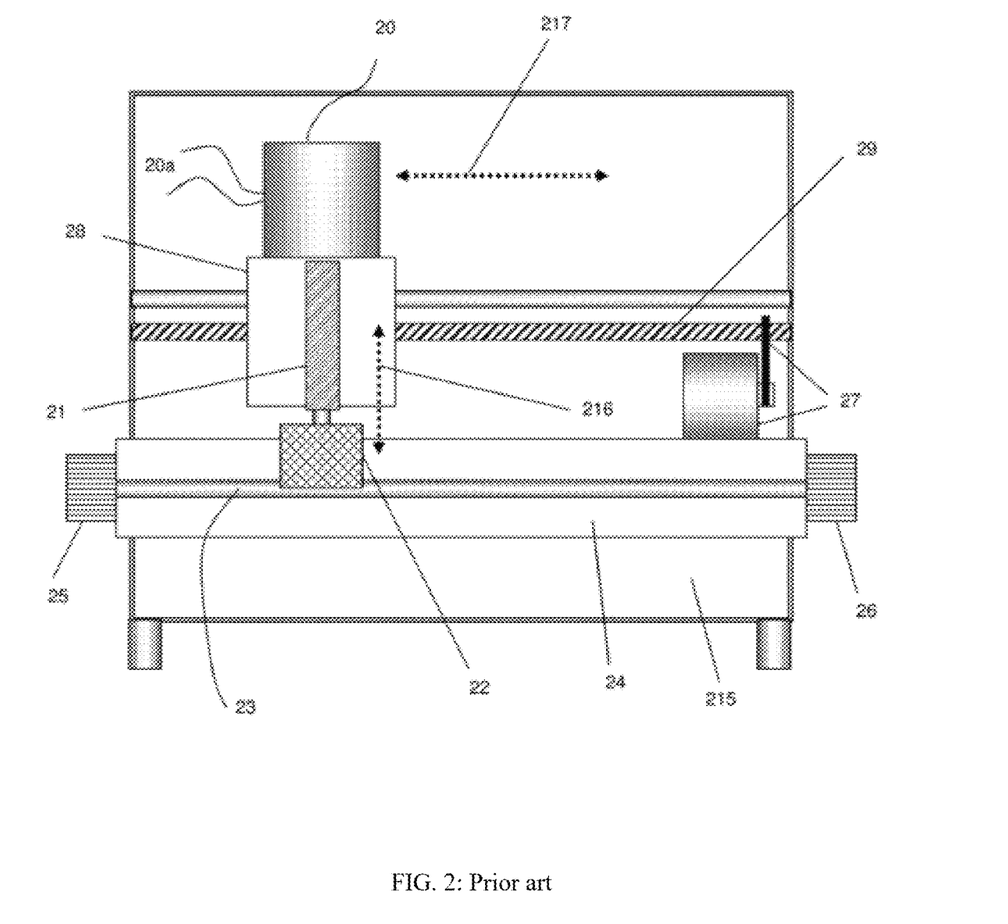
FIG. 2 depicts prior art, a schematic front view of a passive slide screw load pull tuner.

A typical, prior art slide screw tuner is shown in FIG. 2: it includes a slabline 24 with a center conductor 23, a test port 25, facing the DUT, and an idle port 26 connected to adjacent test instruments. Inside the tuner housing 215 there is a mobile carriage 28 traveling 217 along the slabline, driven by an ACME screw 29 and a motor and gear 27; in the carriage 28, there is a vertical axis mechanism 21 moving towards and away 216 from the slabline and holding a capacitively coupled tuning probe (slug) 22. The vertical axis mechanism 21 and the slug 22 are controlled by a second vertical motor 20 which is also remotely controlled 20a. It is this type of traditional, proven, tuner technology this invention uses for the new combination tuning probe.

Figure 3:
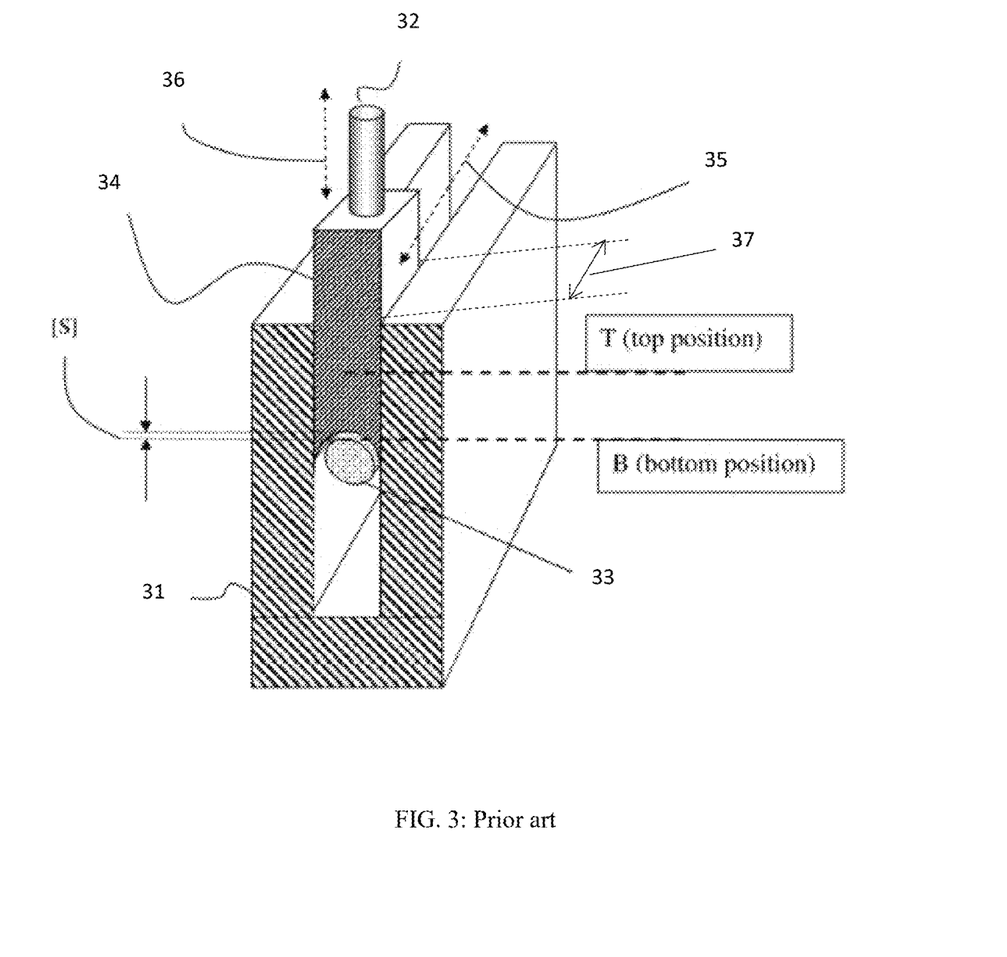
FIG. 3 depicts prior art, a perspective view of a metallic reflective tuning probe (slug) insertable and moving slide-fitting in a slabline.
Figure 4:
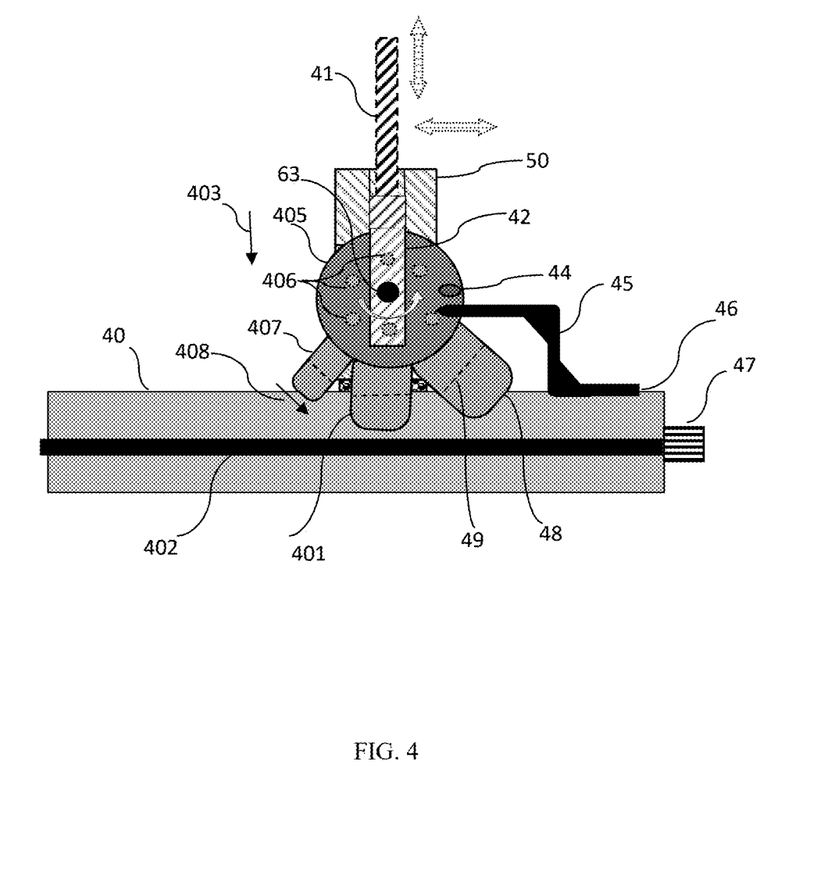
FIG. 4 depicts the configurable tuning probe system comprising three tuning slugs controlled by a revolving holding disc.
Figure 5:
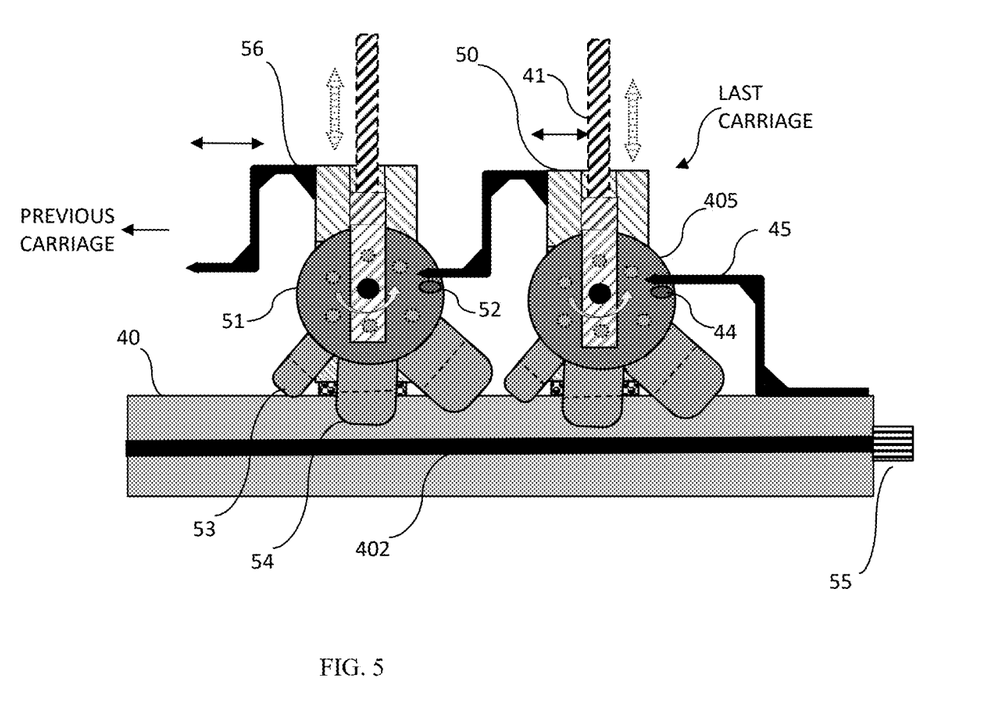
FIG. 5 depicts a set of two configurable tuning probes in the same slabline and details on the slug switching method.

The typical prior art tuning probe (slug) is shown in FIG. 3: it includes a body 34 with rectangular cross section and has a concave bottom matching and mirroring the cylindrical center conductor 33 of the slabline 31 and a holding pin 32 to be attached to the vertical axis mechanism 21. The slug moves vertically 36 and horizontally 35 controlled by the axis 21 and the carriage 28. Vertically it moves between a top position T and a bottom position B leaving a small gap [S] to avoid a short circuit. The length 37 of the parallelepiped slug is defined along the axis of the slabline, the thickness is defined perpendicular to the axis of the slabline The configurable tuning probe assembly is shown in FIG. 4: it is based on the idea that a rotating disc 405, used as a slug carrier, can hold at its periphery several tuning slugs 407, 401, 48, which can penetrate 403 into the slabline 40 closest to the center conductor 402 up to a concavity depth of 49; in the present disclosure this includes three slugs of different length 37 (defined as the dimension along the slabline), but it may, instead, include two or four such slugs, depending on the frequency range to be covered (see FIG. 9). So, the claim is on a revolving 408 slug holder 405 and a number of more than one slug; the revolving slug holder 405 is captured by a bridge 42, which is controlled by the carriage 50 and rotates around its center 63 controlled by the fork 45 which is attached 46 on the slabline 40; when it rotates it is lockable at distinct angles which cause the tuning slugs 407, 401 or 48 to be perpendicular to the center conductor 402; the interlock mechanism between the disc 405 and the legs of the bridge 42 is explained in more detail in FIG. 11; once a slug is aligned and locked against the center conductor 402 the vertical axis 41 is lifted or lowered to approach or withdraw the said slug and control the amplitude of the reflection factor as in prior art tuners (see ref. 2); the method introduced here to remotely rotate the disc 405 consists of using a traverse stud 44 inserted close to the periphery of the disc 405 and engage this stud between the prongs of an adjacent fork 45, which is mounted on the slabline 40 as shown in FIGS. 4 and 5 or, in the case of multi-carriage tuners, on the adjacent carriage's body 50 as shown as items 70 in FIG. 7 and 81 and 83 in FIG. 8.

Figure 6:
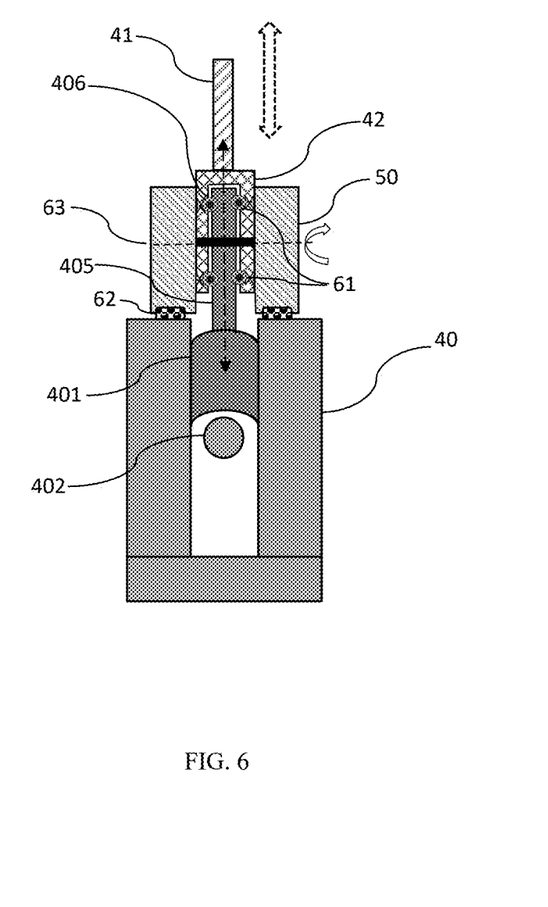
FIG. 6 depicts a cross section of the configurable tuning probe and the vertical locking mechanism.

A cross section of the configurable tuning assembly is shown in FIG. 6: the tuning slug 401 is attached to a disk 405, which appears here as a shaft, and rotates inside the bridge 42 which is attached and controlled by the vertical axis 41; the rotation of the disk 405 is locked using the spring-loaded steel balls 60, 61 popping into and lockable in troughs 406, the whole secured inside the carriage 63, which slides seamlessly on ball bearing sliders 62 on the top wall of, or parallel to, the slabline 40.

Figure 7:
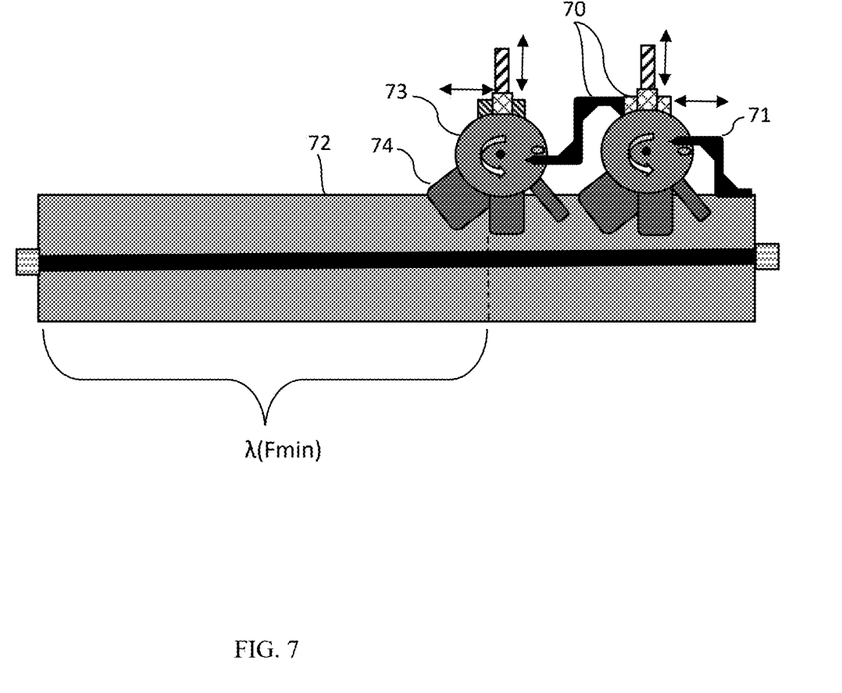
FIG. 7 depicts a set of two configurable tuning probes in the same slabline allowing a multi-band high Gamma or a two-frequency harmonic tuner.

A harmonic tuner requires more than one horizontally and vertically controllable tuning slugs to synthesize, simultaneously and independently, more than one impedance at different or harmonic frequencies see FIG. 7). Each slug 74, controlled by the disk 73 and commutable using the fork 71 must create enough reflection (typically $\Gamma max \geq 0.82$ or $VSWR \geq 10:1$) at all frequencies in question and any frequency F of operation requires the slug to have free travel in the slabline 72 of one half of a wavelength $\lambda/2(F)$ including the longest travel at the minimum frequency Fmin; if the frequencies are harmonic Fo, 2Fo, 3Fo, then each slug of a specific configuration must do so; it is not enough if one frequency covers Fo and other slugs cover 2Fo or 3Fo. This means the effective frequency range for Fo is Fmax/3; example if a slug covers 2-6 GHz, it is usable only at 2 GHz. If it covers 2-9 GHz it is usable from 2 GHz to 3 GHz, etc. This means that to cover continuously a large frequency range the coverage of the slugs must overlap (FIG. 9); in general, using two tuning slugs creates a harmonic tuner for two frequencies Fo and 2Fo; such a layout is shown in FIG. 7: in this schematic case, the first high frequency slug covers trace C, item 407 in FIG. 4, covers 1.05 to 11.5 GHz or $1.05 \leq Fo \leq 3.83$ GHz for a three slug tuner (see FIG. 8) or $1.05 \leq Fo \leq 5.75$ GHz for a two slug configuration (FIG. 7); the second slug, trace B, covers 0.5-2 GHz and the third slug, trace A, 0.2-0.7 GHz; in all cases the available horizontal travel of all the slugs must be one half of a wavelength at the minimum frequency $L=N*\lambda(Fmin)/2$; whereby N is the number of slugs or the number of harmonic frequencies (see ref. 7 and 8); in case of two slugs this means $\lambda(Fmin)$ in case of three slugs it means $1.5\lambda(Fmin)$. Overall, the combo slug system allows a harmonic tuner covering all bands between 0.2 and 11.5 GHz using carriages with a single vertical axis, trace D.

Figure 10:
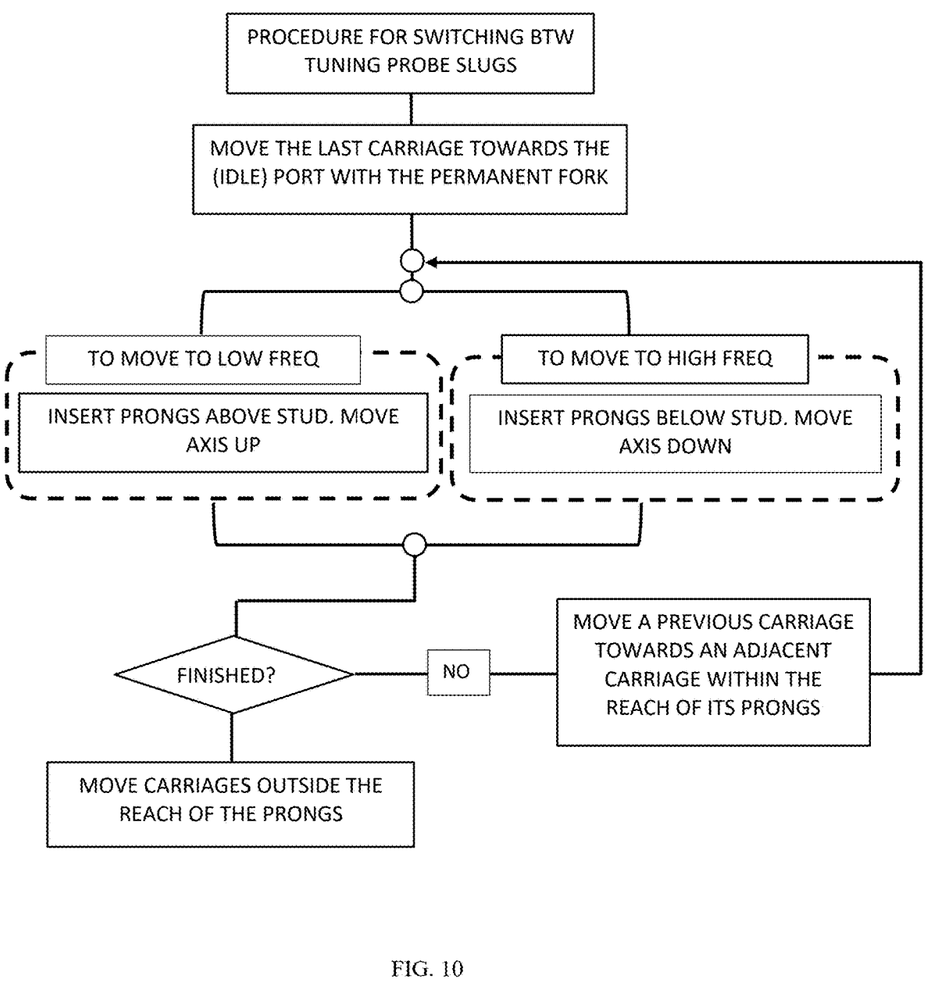
FIG. 10 depicts the flowchart of the procedure for switching between slugs and associated frequency bands.

The core of the invention is the use and remote configurability of multi frequency-range tuning assemblies in harmonic load pull tuners. The tuning assemblies themselves have been discussed above (FIG. 4); the embodiments shown in FIGS. 4, 5, 7 and 8, all show the revolving discs to hold three tuning probes; this is not a must: alternative embodiments are possible including either only two tuning slugs and associated sets of troughs, or more than three; this does not affect the basic idea of the remotely configurable revolving tuning probe assembly. The remote configuration is demonstrated in FIGS. 5 and 6: whereas the carriage and tuning assembly 405 closest to the idle port 55 is controlled by the unmovable fork 45, which is attached to the slabline 40, the remaining carriages and their tuning assemblies 51 are controlled by horizontally mobile forks mounted on carriages 50, 56 facing other carriages; this means, while carriage 82 carries a fork 81, the carriage 80 closest to the test port does not carry a fork; fork 56/81 is only needed if there is a third carriage present (FIG. 8); the configuration procedure is described in the flowchart of FIG. 10; it is shown that for switching slugs it only takes a carriage close to a fork, so that the two prongs of the fork 50 can engage either below or above the traversing studs 52 and then force the disc 51 to revolve towards the desired slug, either by lifting or lowering the vertical axis 41 and allowing the steel balls 61 to drop in and lock in the associated molds (troughs)

Figure 8:
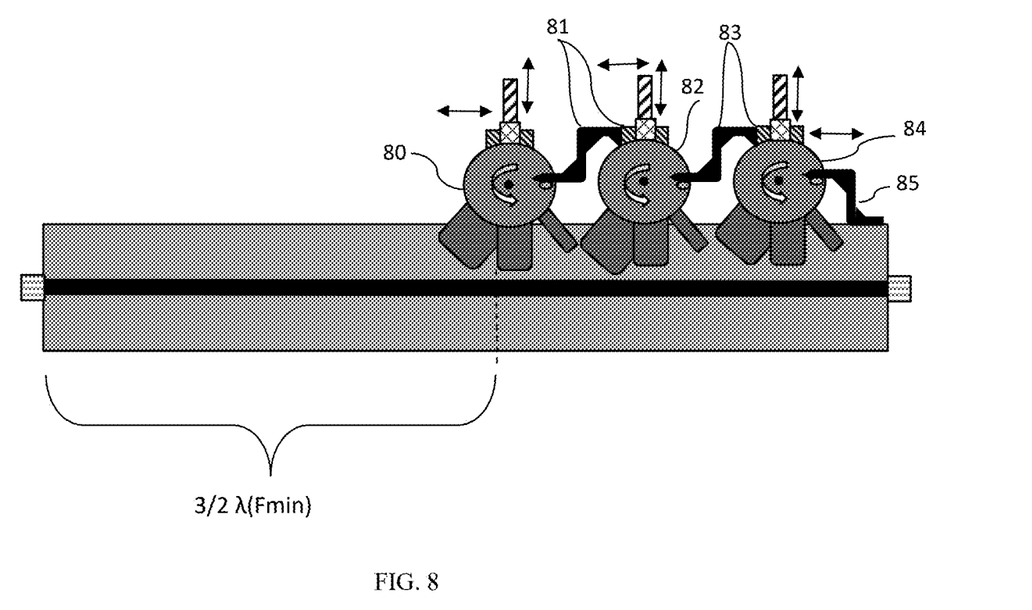
FIG. 8 depicts a set of three configurable tuning probes in the same slabline allowing a multi-band three-frequency harmonic tuner (Fo, 2Fo, 3Fo).
Figure 9:
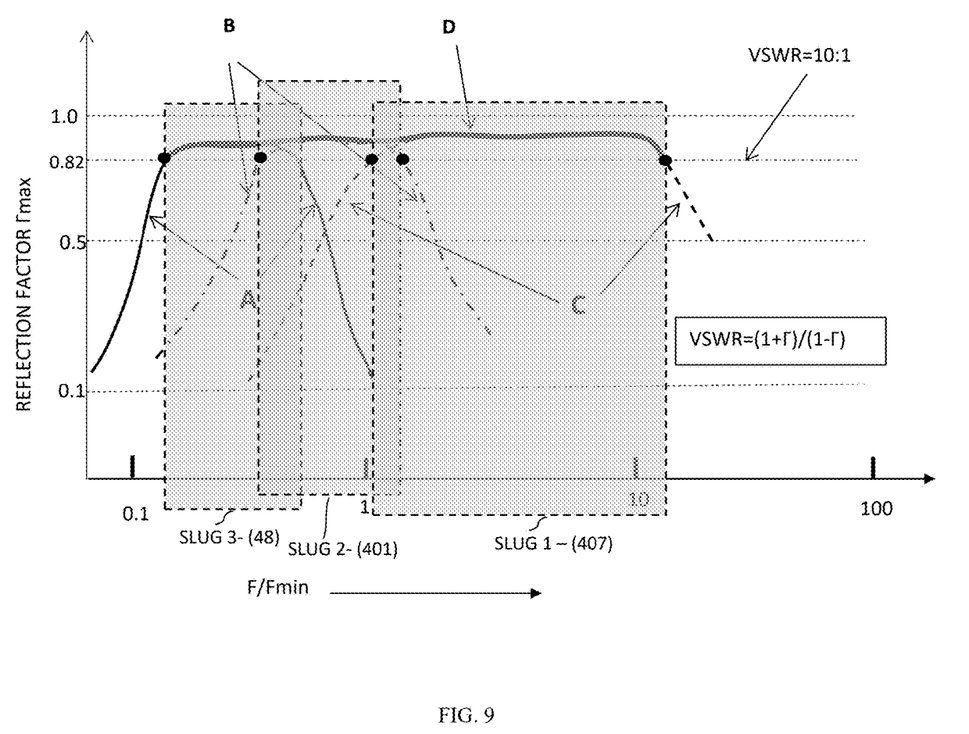
FIG. 9 depicts schematically the overlapping and typical maximum reflection factor of the frequency coverage of the three slugs and the overall picture.

406; the controlling fork can be the permanent fork 45, in which case the carriage 50 must be moved close to the idle port 55/47, but it can be a fork attached to a carriage such as 56, in which case the switch between slugs can be effectuated at any place along the slabline, as long as the two carriages are close enough for the carriage to be configured to have its studs engaged with the fork on the adjacent carriage; this is shown in FIGS. 7 and 8. After all discs 51, 405, 80, 82, 84 . . . and the slugs 53, 54 have been locked in the right position, the carriages are moved successively out of the reach of the prongs 81, 83, 85, the carriages and vertical axes are initialized and the tuner is ready for calibration and operation. The control software needs, of course, to allow, during normal tuning operations, enough horizontal space between carriages, to avoid the studs of any assembly to engage with prongs of an adjacent carriage; this makes, unavoidably, the tuner a little longer, or, for existing tuners, the lowest frequency of operation a little higher.

In any case, to operate in a harmonic mode the slugs covering the three frequencies Fo, 2Fo and 3Fo must be engaged and the tuner recalibrated. Once this is done, then prior art tuning algorithms can be used (see ref. 7).

Figure 11:
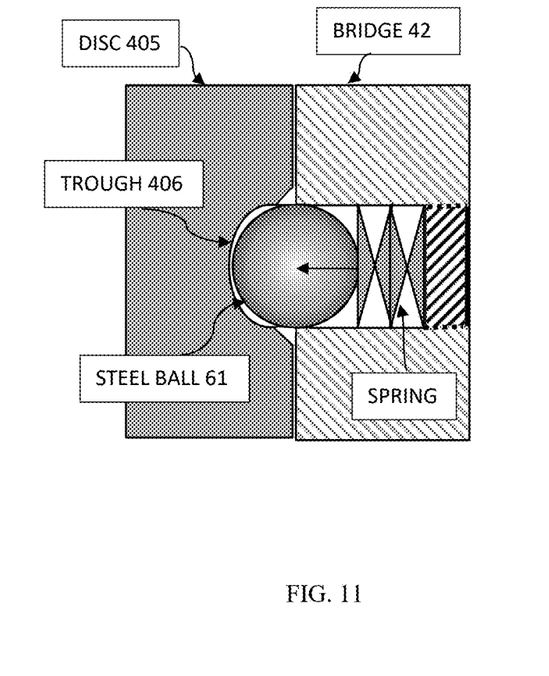
FIG. 11 depicts a detail of the interlock system between the vertically controlled bridge and the revolving disc captured and rotating between its legs.

FIG. 11 shows the detail of the interlock system. It includes a set of holes (molds, troughs) 406 on the front and back surface of the disc 405 and a set of two spring loaded steel balls on the inside of the legs of the bridge 42; the balls protrude slightly less than half their diameter from the surface of the bridge, such that when the disc sheers against the legs of the bridge when pushed by the prongs against the studs 44 it will hop out of the trough and roll on the surface of the disc until it drops into the next trough; this way the disc is locked at another angle and set a different slug vertically against the center conductor 402. Unavoidable manufacturing tolerances in the position and diameter of the troughs versus the rotation center of the discs and the size and positioning of the steel balls, will create a well-defined, zero-play locking system able to resist friction of the slugs while sliding inside the sidewalls against the slabline and eliminate disturbing backlash, leading to measurement inaccuracies.

The present invention discloses a harmonic (multi-carriage, multi-probe), wideband, configurable tuning probe for single vertical axis pr carriage load pull tuners, allowing operation in multi (two, three or more) frequency ranges, whereby allowing widening the instantaneous frequency bandwidth of the tuner, without the need for additional electronic and mechanical gear and remote control. The slugs are mounted and controlled, such as switching between long, short and medium length slugs in one automatically reconfigurable revolving assembly. Obvious alternatives shall not impede the originality of the idea.

What is claimed is:

1. A multi frequency-band harmonic load pull tuner using remotely configurable tuning probes comprising:

a slotted airline (slabline) with two parallel conductive sidewalls and a cylindrical center conductor linking two ports, a test port, and an idle port, and at least two remotely controlled mobile carriages, moving along the slabline, each said carriage including a remotely controlled, perpendicular to the slabline (vertical) axis mechanism which holds a configurable, revolving, multi-slug tuning probe assembly and means for remotely configuring it;

wherein the configurable revolving multi-slug tuning probe assembly includes two units: a saddle unit forming a bridge with two legs and a channel between them along the slabline and a slug holding unit in form of a disc, rotating between the legs of the bridge on a plan parallel to the slabline, and holding at least two tuning slugs at its periphery, which have a parallelepiped body and a concave bottom mirroring the cylindrical center conductor and slide-fitting between the sidewalls of the slabline;

and wherein the disc is lockable, as it rotates between the legs of the bridge, under at least two distinct angles using an interlock mechanism;

and wherein the means for remotely configuring the revolving multi-slug tuning probe assemblies comprise controlling the rotation and locking angles of the discs using metallic forks mounted on the slabline and on selected carriages engaging the discs, and an automated configuration procedure, and wherein the tuning slugs of each disc of a carriage are equal to the corresponding tuning slugs of the discs of the remaining carriages.

2. The interlock mechanism of the remotely configurable multi-slug tuning probe assemblies of claim 1, wherein the discs have a stud traversing it close to the periphery and protruding from the front and back surface, and two sets of at least four equidistant troughs placed diametrically on a concentric cercle between the rotation axis and the periphery of the discs, one set of troughs at their front and one set at their back surface;

and wherein the discs rotate sliding between the legs of the bridges and are lockable, using the interlock mechanism, on at least two angles, each associated with a set of troughs.

3. The interlock mechanism between the discs and the bridges comprising one set of troughs as in claim 2 and two sets of two steel balls inserted diametral into traversing holes in the legs of the bridges mirroring the troughs, protruding spring-loaded perpendicularly towards the discs, rolling on the discs, popping into, and fitting snuggly in the troughs as the discs rotate.

4. The remotely configurable multi-slug tuning probe assembly of the multi frequency-band harmonic load pull tuner of claim 1, wherein each tuning slug is designed for a different frequency range, each said tuning range covering at least one octave;

and wherein the tuning slugs of each tuning assembly are mechanically equal to the corresponding tuning slugs of all tuning assemblies.

5. The means of controlling the configurable multi-slug tuning probe assembly of the multi frequency-band harmonic load pull tuner of claim 1, comprise at least two forks, a first fork attached to the slabline at the idle port and as many further forks as the total number of carriages minus one; said further forks being attached to carriages adjacent to other carriages towards the test port, each said fork having two horizontal prongs spaced at least as the thickness of the discs and less than the thickness of the discs plus the protrusion of the studs.

6. The automated configuration procedure for switching the multi-slug tuning probe assembly of claim 5 between frequency ranges comprising the following steps:
   a) move a carriage within the reach of the prongs of an adjacent fork and all other carriages outside the reach of the prongs of the remaining forks;
   b) to rotate the discs towards a higher frequency range, lift the assembly of the carriage of step a) and engage the prongs of the adjacent fork to catch below the studs and lower the assembly for the steel balls to drop and lock into the next set of troughs;
   c) to rotate the discs towards a lower frequency range, lower the assembly of the carriage of step a) and engage the prongs of the adjacent fork to catch above the studs and lower the assembly for the steel balls to drop and lock into the next set of troughs;
   d) if all discs have been rotated and locked to a desired frequency range, proceed to step e), if not return to step a);
   e) move the carriages outside of the reach of the prongs.

7. The configurable multi-band tuning probe system of claim 5,
   wherein
      after the automated configuration procedure, the discs are locked on the legs of the bridges while moving vertically and horizontally.

8. The multi frequency-band harmonic load pull tuner of claim 1,
   wherein
      the vertical axis mechanisms and the horizontal movement of the mobile carriages are remotely controlled using stepper motors and gear.

* * * * *